United States Patent
O'Keeffe et al.

(10) Patent No.: US 12,281,040 B2
(45) Date of Patent: Apr. 22, 2025

(54) FIRE RATED GLASS UNIT

(71) Applicant: O'KEEFFE'S, INC., Brisbane, CA (US)

(72) Inventors: William F O'Keeffe, Brisbane, CA (US); Sean A Ross, Merced, CA (US)

(73) Assignee: O'KEEFFE'S, INC., Brisbane, CA (US)

( * ) Notice: Subject to any disclaimer, the term of this patent is extended or adjusted under 35 U.S.C. 154(b) by 0 days.

(21) Appl. No.: 18/200,511

(22) Filed: May 22, 2023

(65) Prior Publication Data
US 2023/0295037 A1 Sep. 21, 2023

Related U.S. Application Data

(63) Continuation of application No. 17/730,722, filed on Apr. 27, 2022.

(51) Int. Cl.
| | | |
|---|---|---|
| C03B 27/04 | (2006.01) | |
| C03C 17/28 | (2006.01) | |
| C03C 23/00 | (2006.01) | |

(52) U.S. Cl.
CPC ........ C03C 23/007 (2013.01); C03B 27/0413 (2013.01); C03C 17/28 (2013.01); C03C 2218/31 (2013.01)

(58) Field of Classification Search
CPC .................................................. C03B 27/0413
See application file for complete search history.

(56) References Cited

U.S. PATENT DOCUMENTS

| | | |
|---|---|---|
| 4,516,999 A | 5/1985 | Kiefer |
| 5,910,620 A | 6/1999 | O'Keeffe et al. |
| 2017/0029314 A1 | 2/2017 | Vehmas |

FOREIGN PATENT DOCUMENTS

| | | | | |
|---|---|---|---|---|
| CN | 1693246 A | 11/2005 | | |
| CN | 106565083 A | * 4/2017 | ............... | C03C 3/04 |
| CN | 108503232 A | * 9/2018 | ........... | C03B 27/012 |

OTHER PUBLICATIONS

Translation of CN106565083 (Year: 2017).*
Translation of CN 108503232 (Year: 2018).*
C.C. Sullivan, "Fire-Protective vs Fire-Resistive Glazing", Advertorial course provided by Safti First, Dec. 2006 (Year: 2006).*
Barr, J., "The glass tempering handbook: Understanding the glass tempering process", Originally Published Jan. 15, 2015 at https://dl.orangedox.com/IOM4ukrFcunESCW2Yh/TheGlassTemperingHandbook.pdf, accessed May 3, 2021 at https://belglas.files.wordpress.com/2016/01/theglasstemperinghandbook.pdf (Year: 2015).
A third party submission under 35 CFR 1.290 filed in related U.S. Appl. No. 17/730,722.
National Standard of the People's Republic of China GB 15763.1-2001 Issued on Jul. 13, 2001 English translation only.
National Standard of the People's Republic of China GB 15763.1-2009 Issued on Mar. 28, 2009 English translation only.

* cited by examiner

Primary Examiner — Cynthia Szewczyk
(74) Attorney, Agent, or Firm — Bodi Law LLC

(57) ABSTRACT

An article of fire rated glass and method of producing the same prepared by selecting a sheet of clear float annealed glass of at least 19 millimeters in thickness and providing the edge of the sheet substantially free of imperfections. The glass sheet is then specially tempered at a temperature of at least 575 degrees Celsius for a period of at least 750 seconds, followed by a cooling step.

25 Claims, 3 Drawing Sheets

FIRE RATED GLASS UNIT

CROSS-REFERENCES TO RELATED APPLICATIONS

The present application is a continuation of U.S. patent application Ser. No. 16/135,959 filed on 19 Sep. 2018 which claims the benefit of both U.S. Provisional Application No. 62/722,762 filed 24 Aug. 2018, and U.S. Provisional Application No. 62/727,923 filed 6 Sep. 2018, all incorporated herein by reference.

BACKGROUND OF THE INVENTION

The present application relates to a novel and useful fire-rated glass unit and a method of producing the same.

Fire-rated glass can be used in windows, doors, and walls within building structures. Fire-rated glass is intended to withstand the blockage of heat transfer through the glass generally as a result of a fire adjacent the structure. Fire-rated glass is determined by a standard fire exposure test identified as the National Fire Protection Association 257 test (NFPA-257). Consequently, as a result of the implementation of such tests on glass, a rating is assigned according to the number of minutes a piece of glass has maintained its integrity during the test.

In the past, fire-rated glass was available having wire imbedded within the glass. Although the wire embedded glass gives additional strength and endurance to glass, such wire embedded glass has fallen in disfavor due to the infliction of severe wounds on persons coming into contact with a shattered or broken piece of wired glass.

As a substitute for wired glass, fire resistant glass has been constructed using a laminated product which possesses an inner layer of intumescent material in the form of a solid or liquid. Also, single panes of "ceramic glass", have been also substituted for wire embedded glass in structures. "Ceramic glass" is not a true glass, and is more accurately described as a "clear or transparent ceramic material". Although transparent ceramic materials have successfully served as a fire resistant inserts for windows, doors, and the like, transparent ceramic panels are quite expensive when compared to true glass. Thus, the cost of transparent ceramic material as a substitute for wired glass has been hampered due to such high cost of transparent ceramic material.

In the past, fire-rated glass structures have been proposed such as that found in U.S. Pat. No. 5,910,620, where two tempered glass sheets are separated by a resin layer to provide fire resistance.

Consequently, there is a need to provide a fire-rated glass that is composed of true glass without the need to resort to ceramic materials or laminated multi-panel glass units.

SUMMARY OF THE INVENTION

In accordance with the present application, a novel and useful fire-rated glass unit is herein provided.

The fire-rated glass unit includes the selecting of a single sheet of true glass having a thickness of at least 19 mm. The single sheet of true glass is further inspected for any edge imperfections such as pitting, scratches, inclusions, and the like. The edges of the sheet of glass are then polished, if needed, to remove such imperfections, typically by forming a rounded or chamfered edge surface.

Once the sheet of glass has been prepared, as stated above, it is subjected to a special tempering process. In addition, following the special tempering process the tempered glass sheet has undergone the NFPA-257 fire exposure test, above identified, to achieve or be awarded a fire rating.

It may be apparent that a novel and useful unit of fire-rated glass and a method for creating the same has been hereinabove described.

It is therefore an object of the present application to provide a unit of fire-rated glass and a method of producing the same that is capable of substituting for existing wired glass.

Another object of the present application is to provide a unit of fire-rated glass and a method of producing the same that may be substituted for clear ceramic materials or glass laminate structures.

Another object of the present application is to provide a unit of fire-rated glass and a method of producing the same that uses true glass, as a raw material, such as soda-lime-silica glass and the like.

Another object of the present application is to provide a unit of fire-rated glass and a method of producing the same that may be used with windows, doors, floors, and the like where transparent fire-rated materials are necessary.

Another object of the present application is to provide a unit of fire-rated glass and a method of producing the same that possesses better visual clarity over prior art wired glass.

Another object of the present application is to provide a unit of fire-rated glass and a method of producing the same that exhibits superior impact resistance.

Another object of the present application is to provide a unit of fire-rated glass and a method of producing the same that is useful with varied architectural make-ups.

The application possesses other objects and advantages especially as concerns particular characteristics and features thereof which will become apparent as the specification continues.

For a better understanding of the application, reference is made to the following detailed description of the preferred embodiments thereof which should be referenced to the prior described drawings.

DETAILED DESCRIPTION OF THE PREFERRED EMBODIMENTS

The following detailed descriptions of the preferred embodiments of the application are set forth in considerable detail and should be taken in conjunction with the prior delineated drawings.

Figure 1:
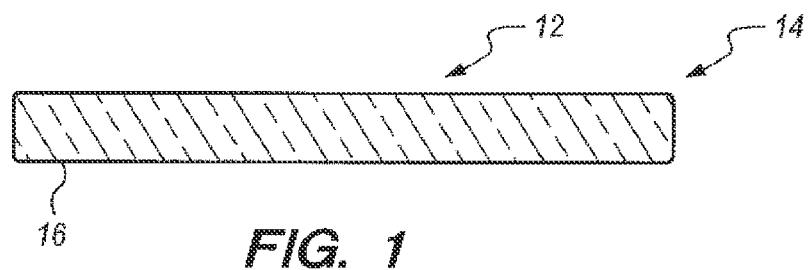
FIG. 1 is a sectional view of a sheet of true glass.
Figure 2:
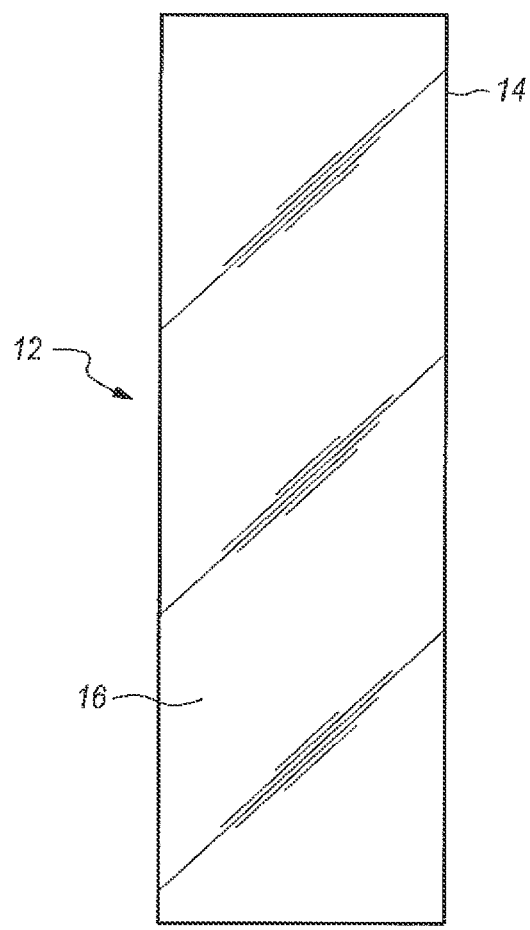
FIG. 2 is a top plan view of the sheet of true glass shown in FIG. 1.

An embodiment of the invention as a whole is denoted by reference character 10. Turning to FIGS. 1 and 2, it may be observed that a selected sheet of glass 12 is shown as the starting material for fire-rated glass 10 of the present application, FIGS. 5-7. Sheet of glass 12 includes an edge or perimeter 14 and is formed into a generally rectangular shape, as depicted in FIG. 2. Glass sheet 12 is true glass being translucent in nature. The term "true glass" is intentionally meant to exclude "ceramic glass" or clear ceramic material, which lacks the overall amorphous construction of true glass in that "ceramic glass" includes one or more crystalline phases. In essence, the term "ceramic glass" is a misnomer and should be properly referred to as a "transparent or clear ceramic". Also, true glass is commonly referred to as "regular glass", "float glass", "plate glass", "sheet glass", and the like. Normally, soda-lime-silica glass is used, with certain chemical variations, for windows and doors. In addition, glass sheet 12 has been annealed through conventional techniques and is commonly described as clear float annealed glass. Moreover, it is important that original glass sheet 12 be thoroughly inspected to make sure that edge imperfections such as "clam shell" chips, hairline cracks, grinding wheel scratches, and the like, are non-existent, as these will detrimentally affect the special tempering step of glass sheet 12, described hereinafter. It should be noted that glass sheet 12 is a relatively thick glass sheet having a thickness of at least 19 mm. Outer surface 16 of glass sheet 12 is then thoroughly cleaned in a conventional manner. Edge or perimeter 14 of glass sheet 12 is then carefully inspected for any imperfections. When necessary, edge 14 is polished to substantially remove such imperfections.

Figure 3:
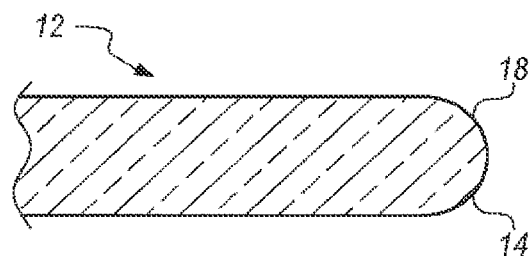
FIG. 3 is a partial sectional view showing a polished edge portion of a glass sheet that is rounded or pencil polished.
Figure 4:
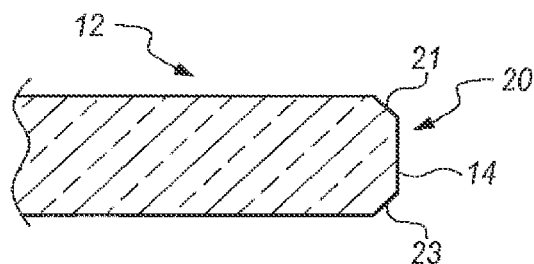
FIG. 4 is a sectional view showing a polished edge portion of a glass sheet having a beveled edge portion.

FIGS. 3 and 4 represent edge polishing possibilities for edge 14 of glass sheet 12. FIG. 3 shows a rounded finish 18, known as a pencil polish finish. FIG. 4 represents a chamfer 20 of glass sheet 12 where bevels 21 and 23 have been applied to the edge 14 of glass sheet 12 to form such beveled chamfered finish.

Figure 5:
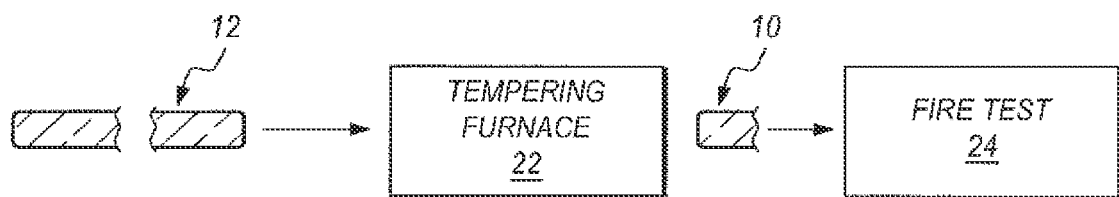
FIG. 5 is a schematic view indicating the movement of glass sheet of FIGS. 1 and 2 through a tempering furnace and subsequently to a fire exposure test.

Turning now to FIG. 5, it may be seen that the unique method of producing fire-rated glass 10 consists of specifically tempering glass sheet 12 by feeding glass 12 sheet through a tempering furnace 22. The special tempering process includes passing glass sheet 12 through tempering furnace for an unusually long period of time ranging between 750 and 960 seconds, preferably between 800 and 900 seconds. Such tempering may take place on a continuous or batch basis. A continuous rate of passage through tempering furnace 22 ranges between 60 and 450 millimeters per second. The heat applied to glass sheet 12 within tempering furnace 22 varies between 600 and 670 degrees Celsius for the period of time noted. Following the application of heat within tempering furnace 22, sheet of glass 12 is air quenched by top and bottom nozzles within tempering furnace in a conventional manner. The pressure of the nozzles is generally about 100 millimeters. After exiting tempering furnace 22, fire-rated glass sheet 10 exhibits a surface compression of approximately 10,000 pounds per square inch.

Specially tempered glass sheet 10 is then available for subjection to a fire test 24 to achieve a fire rating, which will be described hereinafter.

Figure 6:
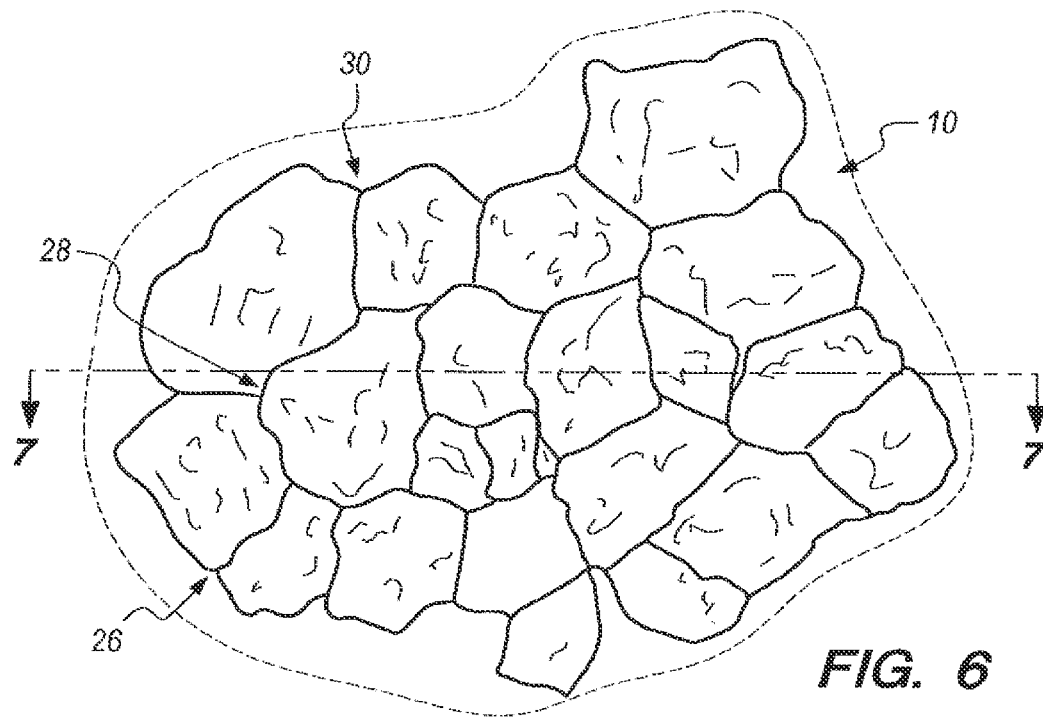
FIG. 6 is a top plan view of a portion of the surface of the sheet of glass of FIGS. 1 and 2 following the application of the fire exposure test identified as the NFPA-257 test.
Figure 7:
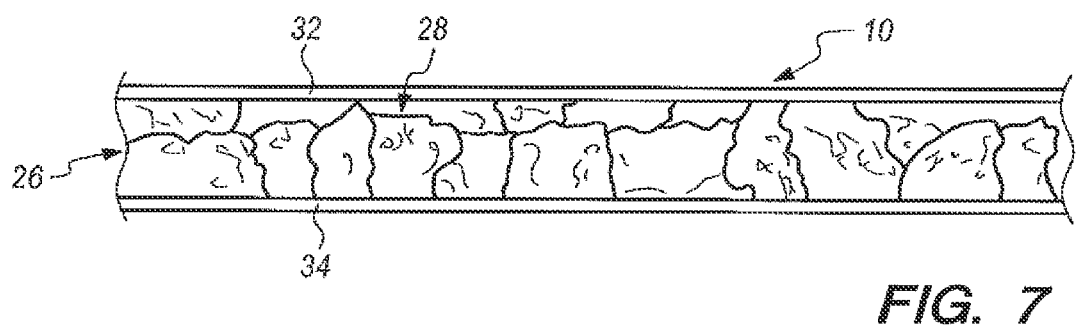
FIG. 7 is a sectional view taken along line 7-7 of FIG. 6.

A fire exposure test 24 may be employed to achieve an accepted fire rating of glass sheet 10. Fire exposure test 24 has been conducted according to a standard protocol known as the National Fire Protection Association 257 test (NFPA-257). The NFPA-257 fire exposure test may extend anywhere between a time period of 5 minutes and 3 hours. In the present case, several fire-rated glass sheets 10 were tested successfully for as long as 90 minutes where temperatures approached 980 degrees Celsius. Generally, the NFPA-257 fire exposure test comprises two stages: a fire test stage where flame heat is applied for a particular amount of time followed by a hose stream test stage, where water is applied to the heated glass after removal of the flame heat source. In the present case, as a result of the NFPA-257 fire exposure test, glass 10 exhibited the surface visible patterns shown in FIGS. 6 and 7. FIG. 6 shows a section of the surface area of glass sheet 10 following the hose stream test portion of fire exposure test 24, where a fractured pattern 26 appears without shattering of the glass sheet 10. That is to say, glass sheet 10 maintained a single sheet integrity. It is believed that the plurality of seams 28 between the plurality of solid portions 30 of glass sheet 10 softened, but re-adhered to one another to maintain the integrity of entire glass sheet 10 following such hose stream portion of the fire exposure test 24. FIG. 7 shows the adhered fracture seams 28 as being irregular between chamfered edges 30 and 32 of glass sheet 10. It is believed this unusual result is due to the prior described special tempering process applied to glass sheet 12.

Subsequent to the tempering process, fire-rated glass 10 may be overlain with a suitable coating such as a bonded polymer base. Such coating would help increase the performance and strength of the glass surface of fire-rated glass 10 when mounted for use in a window or door frame.

The following working examples are provided to illustrate the present invention but are not deemed as a limitation thereto.

Working Example I

A rectangular sheet of clear float annealed glass having a 96 inch length, 48 inch width and ¾ inch (19 millimeters) thickness was tempered for 840 seconds at a temperature of about 640-670 degrees Celsius, followed by an air quench. The tempered sheet was then subjected to the NFPA-257 fire exposure test and failed such test by shattering at 10 minutes into the fire test portion. Inspection of the sheet of glass revealed perimeter imperfections.

Working Example II

A selected rectangular sheet of clear float annealed glass having a 96 inch length, 48 inch width, and a ¾ inch thickness was tempered for only 600 seconds at 650 degrees Celsius in a tempering furnace. The tempered sheet was then subjected to the NFPA-257 fire exposure test and failed such test by shattering at 5 minutes, into the fire test portion. At the point of failure, the glass sheet reached a temperature of about 580 degrees Celsius (1,000 degrees Fahrenheit).

Working Example III

A rectangular sheet of clear float annealed glass having a length of 96 inches, a width of 48 inches, and a thickness of ¾ inch (19 millimeters) was selected. The sheet was then inspected for perimeter imperfections. The edge was then finely abraded to create a pencil polished finish. The sheet was tempered for an extended period of 960 seconds at about 650 degrees Celsius in a tempering furnace and air quenched. The sheet was then subjected to the NFPA-257 fire exposure test and failed by shattering after 15 minutes into the fire test.

Working Example IV

A rectangular sheet of clear float annealed glass having a length of 11¼ inches, a width of 11¼ inches, and a thickness of ¾ inch (19 millimeters) was selected. The sheet was then inspected for perimeter imperfections. The edge of the sheet was then polished to create a penciled edge. The sheet was then specially tempered for 840 seconds at a temperature of about 640-670 degrees Celsius in a tempering furnace and air quenched. The specially tempered sheet was then subjected to the NFPA-257 fire exposure test and passed such test, including the fire and hose stream portions, at 90 minutes, by maintaining integrity.

Working Example V

A rectangular sheet of clear float annealed glass having a length of 60 inches, a width of 20 inches, and a thickness of ¾ inch (19 millimeters) was selected. The sheet was then inspected for perimeter imperfections. The edge of the sheet was further polished to create a chamfered finish. The sheet was then specially tempered for 800 seconds at a temperature of about 640-670 degrees Celsius in a tempering furnace and air quenched. The specially tempered sheet was then subjected to the NFPA-257 fire exposure test, including the fire and hose stream portions and passed such test at 45 minutes by maintaining integrity.

Working Example VI

A rectangular sheet of clear float annealed glass having a length of 96 inches, a width of 48 inches, and a thickness of ¾ inch (19 millimeters) was selected. The sheet was the inspected for perimeter imperfections. The edge of the sheet was then polished to create a penciled edge. The sheet was then specially tempered for 840 seconds at a temperature of about 600-670 degrees Celsius in a tempering furnace, and air quenched. The specially tempered sheet was then subjected to the NFPA-257 fire exposure test and passed such test, including the fire and hose stream portions, at 90 minutes, by maintaining integrity.

Working Example VII

A rectangular sheet of clear float annealed glass having a length of 99⅝ inches, a width of 33 inches, and a thickness of ¾ inch (19 millimeters) was selected. The sheet was the inspected for perimeter imperfections. The edge of the sheet was then polished to create a penciled edge. The sheet was then specially tempered for 840 seconds at a temperature of about 640-670 degrees Celsius in a tempering furnace, and air quenched. The specially tempered sheet was then subjected to the NFPA-257 fire exposure test and passed such test, including the fire and hose stream portions, at 90 minutes, by maintaining integrity.

Working Example VIII

Four identical sheets of glass each having dimensions 36 inches wide, 76 inches high, and ¾ inch (19 millimeters) thick were specially tempered using the tempering process of Working Example VI. Each tempered sheet of specially tempered glass was then subjected to an impact test according to the test methods specified by Consumer Product Safety Commission (CPSC) 16 CFR 1201 CAT II and the American National Standards Institute (ANSI) Z97.1 CAT A. Thus, each upright sheet of specially tempered glass received an impact force of 400 foot-pounds applied to its center surface. All of the sheets of specially tempered glass withstood the impact force without breaking. Following the impact step, the edges of each sheet of specially tempered glass were broken with a center-point punch. The 10 longest broken particles of each sheet of specially tempered glass were collected and weighed. The combined weight of the 10 particles of each sheet was less than the weight of 10 square inches of the unbroken sheets of glass (238 grams). Thus, each sheet of specially tempered glass passed the CPSC 16 CFR 0201 CAT II and ANSI Z97.1 CAT A tests.

The invention claimed is:

1. A method of providing a fire rated glass unit, comprising the steps of:
   providing a sheet of heat treated clear float annealed glass that was treated to become a fire rated glass unit;
   testing said fire rated glass unit according to the NFPA-257 fire exposure test, said testing including the step of performing a host stream test on said fire rated glass unit, wherein
   said fire rated glass unit passes said hose stream test maintaining entire sheet integrity.

2. The method of claim 1, wherein said fire rated glass is rated for at least 45 minutes heat exposure without failure.

3. The method of claim 1, wherein said fire rated glass is rated for at least 60 minutes heat exposure without failure.

4. The method of claim 1, wherein said sheet of heat treated clear float annealed glass is at least 19 mm thick.

5. The method of claim 1, wherein said sheet of heat treated clear float annealed glass that was treated to become a fire rated glass unit by including a step of heating said clear float annealed glass in a furnace and subsequently cooling the heated glass in a conventional manner to form said fire rated glass unit.

6. The method of claim 5, wherein said heating step is performed in a furnace at a temperature of between about 600 degrees Celsius to about 670 degrees Celsius.

7. The method of claim 6, wherein said heating step is performed for a period of between about 800 seconds to about 840 seconds.

8. The method of claim 5, wherein said heating step is performed in a furnace for a period of between about 800 seconds to about 840 seconds.

9. The method of claim 1, wherein said sheet of heat treated clear float annealed glass that was treated to become a fire rated glass unit by including a step of providing any edges of said sheet of clear float annealed glass substantially free of imperfections.

10. The method of claim 1, wherein said sheet of fire rated glass exhibits a surface compression of approximately 10,000 psi.

11. The method of claim 1, wherein said sheet of fire rated glass maintains entire sheet integrity subsequent to said hose stream test despite fracturing during said testing.

12. The method of claim 1, wherein said sheet of fire rated glass is rated to the American National Standards Institute (ANSI) Z97.1 CAT A, and/or rated to Consumer Product Safety Commission 16 CFR 1201 CAT II.

13. A method of providing a fire rated glass unit, comprising the steps of:
   providing a sheet of heat treated clear float annealed glass that was treated to become a fire rated glass unit;
   testing said fire rated glass unit according to the NFPA-257 fire exposure test, said testing including the step of performing a host stream test on said fire rated glass unit, wherein
   during said hose stream test, said fire rated glass unit forms a fractured pattern of broken glass that maintains single sheet integrity during and after said testing.

14. The method of claim 13, wherein said fire rated glass is rated for at least 45 minutes heat exposure without failure.

15. The method of claim 13, wherein said sheet of heat treated clear float annealed glass is at least 19 mm thick.

16. The method of claim 13, wherein said sheet of heat treated clear float annealed glass was treated to become a fire rated glass unit by including a step of providing any edges of said sheet of clear float annealed glass substantially free of imperfections.

17. The method of claim 13, wherein said sheet of fire rated glass exhibits a surface compression of approximately 10,000 psi.

18. The method of claim 13, wherein said sheet of fire rated glass is rated to the American National Standards Institute (ANSI) Z97.1 CAT A, and/or rated to Consumer Product Safety Commission 16 CFR 1201 CAT II.

19. A method of providing a fire rated glass unit, comprising the steps of:
   providing a sheet of heat treated clear float annealed glass at least 19 mm thick that was treated to become a fire rated glass unit;
   testing said fire rated glass unit including the step of performing a host stream test on said fire rated glass unit such that said sheet of fire rated glass maintains entire sheet integrity subsequent to a hose stream test for obtaining a fire rating, wherein
   said fire rated glass is rated for at least 45 minutes heat exposure without failure.

20. The method of claim 19, wherein said fire rating is in accord with meeting the National Fire Protection Association-257 fire exposure test.

21. The method of claim 19, wherein said sheet of heat treated clear float annealed glass was treated to become a fire rated glass unit by including a step of providing any edges of said sheet of clear float annealed glass substantially free of imperfections.

22. The method of claim 19, wherein said heating step is performed in a furnace at a temperature of between about 600 degrees Celsius to about 670 degrees Celsius for a period of between about 800 seconds to about 840 seconds.

23. The method of claim 19, wherein said sheet of fire rated glass is rated to the American National Standards Institute (ANSI) Z97.1 CAT A, and/or rated to Consumer Product Safety Commission 16 CFR 1201 CAT II.

24. A method of providing a fire rated glass unit, comprising the steps of:
   providing a sheet of heat treated clear float annealed glass at least 19 mm thick that was treated to become a fire rated glass unit using conventional quenching procedures after heating in a furnace;
   testing said fire rated glass unit according to the NFPA-257 fire exposure test, said testing including the step of performing a host stream test on said fire rated glass unit such that said sheet of fire rated glass maintains entire sheet integrity subsequent to the hose stream test for obtaining a fire rating, wherein
   said fire rated glass is rated for at least 45 minutes heat exposure without failure under the NFPA-257 fire exposure test, and wherein
   said sheet of fire rated glass is rated to the American National Standards Institute (ANSI) Z97.1 CAT A and/or rated to Consumer Product Safety Commission 16 CFR 1201 CAT II.

25. The method of claim 24, wherein said heating in the furnace is performed at a temperature of between about 600 degrees Celsius to about 670 degrees Celsius for a period of between about 800 seconds to about 840 seconds.

* * * * *